US012387456B1

(12) United States Patent
Shu et al.

(10) Patent No.: US 12,387,456 B1
(45) Date of Patent: Aug. 12, 2025

(54) PLATFORM FOR DISTRIBUTED LANDCOVER FEATURE DATA REVIEW

(71) Applicant: ECOPIA TECH CORPORATION, Toronto (CA)

(72) Inventors: Yuanming Shu, Toronto (CA); Shuo Tan, Campbell, CA (US); Tuan Zhao, Toronto (CA); Huansheng Mo, Guilin (CN)

(73) Assignee: ECOPIA TECH CORPORATION, Toronto (CA)

( * ) Notice: Subject to any disclaimer, the term of this patent is extended or adjusted under 35 U.S.C. 154(b) by 0 days.

(21) Appl. No.: 19/176,112

(22) Filed: Apr. 10, 2025

Related U.S. Application Data

(63) Continuation of application No. 18/437,477, filed on Feb. 9, 2024.
(Continued)

(51) Int. Cl.
| | |
|---|---|
| *G06V 10/44* | (2022.01) |
| *G06T 7/11* | (2017.01) |
| *G06T 7/50* | (2017.01) |
| *G06T 7/62* | (2017.01) |
| *G06V 20/10* | (2022.01) |
| *G06V 20/13* | (2022.01) |
| *G06V 20/17* | (2022.01) |

(52) U.S. Cl.
CPC ............ *G06V 10/44* (2022.01); *G06T 7/11* (2017.01); *G06T 7/50* (2017.01); *G06T 7/62* (2017.01); *G06V 20/10* (2022.01); *G06V 20/13* (2022.01); *G06V 20/17* (2022.01); *G06T 2207/20081* (2013.01); *G06T 2207/30181* (2013.01); *G06T 2207/30188* (2013.01); *G06V 20/176* (2022.01); *G06V 20/182* (2022.01); *G06V 20/188* (2022.01)

(58) Field of Classification Search
CPC ..... G06T 7/11; G06T 7/50; G06T 7/62; G06T 2207/20081; G06T 2207/30181; G06T 2207/30188; G06V 10/44; G06V 20/10; G06V 20/13; G06V 20/17; G06V 20/176; G06V 20/182; G06V 20/188
See application file for complete search history.

(56) References Cited

U.S. PATENT DOCUMENTS

| | | |
|---|---|---|
| 8,488,845 B1 | 7/2013 | Tang et al. |
| 11,170,264 B2 * | 11/2021 | Sallee .............. G06V 20/20 |

(Continued)

OTHER PUBLICATIONS

Kim et al. "Cooperative scheduling schemes for explainable DNN acceleration in satellite image analysis and retraining." IEEE Transactions on Parallel and Distributed Systems 33.7 (2021): 1605-1618. (Year: 2021).*

(Continued)

*Primary Examiner* — Katrina R Fujita
(74) *Attorney, Agent, or Firm* — Damian Rolfe

(57) ABSTRACT

Methods and systems for extracting and reviewing landcover feature data are provided. An example method involves accessing geospatial imagery covering a geographic area and landcover feature data extracted from the geospatial imagery, subdividing the geospatial imagery into a grid of image tiles, assigning landcover feature data review technicians to review the image tiles and associated landcover feature data through a landcover feature data review platform, and receiving revised landcover feature data that modifies the landcover feature data.

11 Claims, 7 Drawing Sheets

Related U.S. Application Data

(60) Provisional application No. 63/598,396, filed on Nov. 13, 2023, provisional application No. 63/515,671, filed on Jul. 26, 2023.

(56) References Cited

U.S. PATENT DOCUMENTS

| | | | |
|---|---|---|---|
| 11,372,687 B1 | 6/2022 | Hollosi et al. | |
| 11,830,246 B2 | 11/2023 | Fleisig et al. | |
| 2013/0046829 A1* | 2/2013 | Coch | H04W 4/023 |
| | | | 709/204 |
| 2017/0249514 A1 | 8/2017 | Folkens et al. | |
| 2021/0042530 A1* | 2/2021 | Kim | G06V 20/46 |
| 2021/0342586 A1 | 11/2021 | Fleisig et al. | |
| 2022/0051017 A1* | 2/2022 | Choi | G06V 10/764 |
| 2024/0362898 A1* | 10/2024 | Brumby | G06V 10/82 |

OTHER PUBLICATIONS

Paris et al. "An interactive strategy for the training set definition based on active self-paced learning implemented on a cloud-computing platform." IEEE Geoscience and Remote Sensing Letters 19 (2021): 1-5. (Year: 2021).*

Plazas et al. "Ensemble-based approach for semisupervised learning in remote sensing." Journal of Applied Remote Sensing 15.3 (2021): 034509-034509. (Year: 2021).*

Robinson et al. "Human-machine collaboration for fast land cover mapping." Proceedings of the AAAI Conference on Artificial Intelligence. vol. 34, No. 03. 2020. (Year: 2020).*

Wagner et al. "Applying cooperative machine learning to speed up the annotation of social signals in large multi-modal corpora." arXiv preprint arXiv:1802.02565 (2018). (Year: 2018).*

PCT/IB2024/052277, International Search Report, May 8, 2024.

PCT/IB2024/052277, Written Opinion of the International Searching Aurhotiy, May 8, 2024.

Scott et al., "Training Deep Convolutional Neural Networks for Land Cover Classification of High-Resolution Imagery", IEEE Geoscience and Remote Sensing Letters, Feb. 17, 2017 (Feb. 17, 2017), vol. vol. 14, Issue: 4, pp. 549-553, [online retrieved on Apr. 30, 2024 (Apr. 30, 2024)]. Retrieved from the Internet: https://ieeexplore.ieee.org/abstract/document/7858676.

* cited by examiner

US 12,387,456 B1

PLATFORM FOR DISTRIBUTED LANDCOVER FEATURE DATA REVIEW

CROSS-REFERENCE TO RELATED APPLICATIONS

This application claims the benefit under 35 U.S.C. § 120 as a continuation of U.S. patent application Ser. No. 18/437,477, filed Feb. 9, 2024, which claims the benefit under 35 U.S.C. § 119(e) of U.S. Provisional App. 63/515,671, filed Jul. 26, 2023, and U.S. Provisional App. 63/598,396, filed Nov. 13, 2023. The contents of each of the aforementioned applications are incorporated herein by reference in their entirety.

BACKGROUND

Landcover feature extraction has become increasingly important for a variety of applications, including urban planning, agriculture, and environmental monitoring. Landcover feature data can be extracted through manual means (e.g., by manual user annotation of geospatial imagery), or through automated means (e.g., by a machine learning model trained to extract such features directly from imagery). Whether extracted manually or through automated means, the scale of such an operation typically necessitates a quality control process in which the extracted data is reviewed for errors by human technicians and corrected where appropriate.

DETAILED DESCRIPTION

As mentioned above, an automated landcover feature extraction process should be followed by a quality control step in which the data extracted by the automated process is reviewed for errors by human technicians and corrected where appropriate. This kind of quality control process can present challenges at scale in cases where there are large swathes of geospatial imagery covering a wide area of interest and several layers of feature types to review.

Since the process for reviewing geospatial data at large scales can be time-consuming, areas of interest are often broken down into smaller work areas (i.e., image tiles) which are distributed among teams of data reviewers. However, a common problem with this approach is that landcover features cannot always be contained within individual image tiles. Indeed, if an area of interest were simply divided into a grid of non-overlapping image tiles, it would be exceedingly common for a landcover feature to land on the border between two adjacent image tiles. As a result, if two or more landcover feature data reviewers are assigned to work on adjacent image tiles simultaneously, conflicts can arise in the area bordering the adjacent image tiles. These problems not only complicate the distribution of data review tasks, but can also lead to inconsistencies and/or duplication of work among data reviewers, thereby slowing processing times and potentially decreasing accuracy.

As will be seen below, the present disclosure provides a system in which data review tasks are distributed among data review technicians in a manner that minimizes conflicts. Further, a platform is provided in which data review technicians are empowered to cooperate with one another at the boundaries between adjacent image tiles through the use of various annotation tools that transform what was once a source of conflict into an opportunity to further refine data accuracy. This kind of distributed data review platform may be particularly useful when integrated into a machine learning extraction process, as the human-revised data can provide a source of ongoing source of training data to support continual fine-tuning of the machine learning model.

Figure 1:
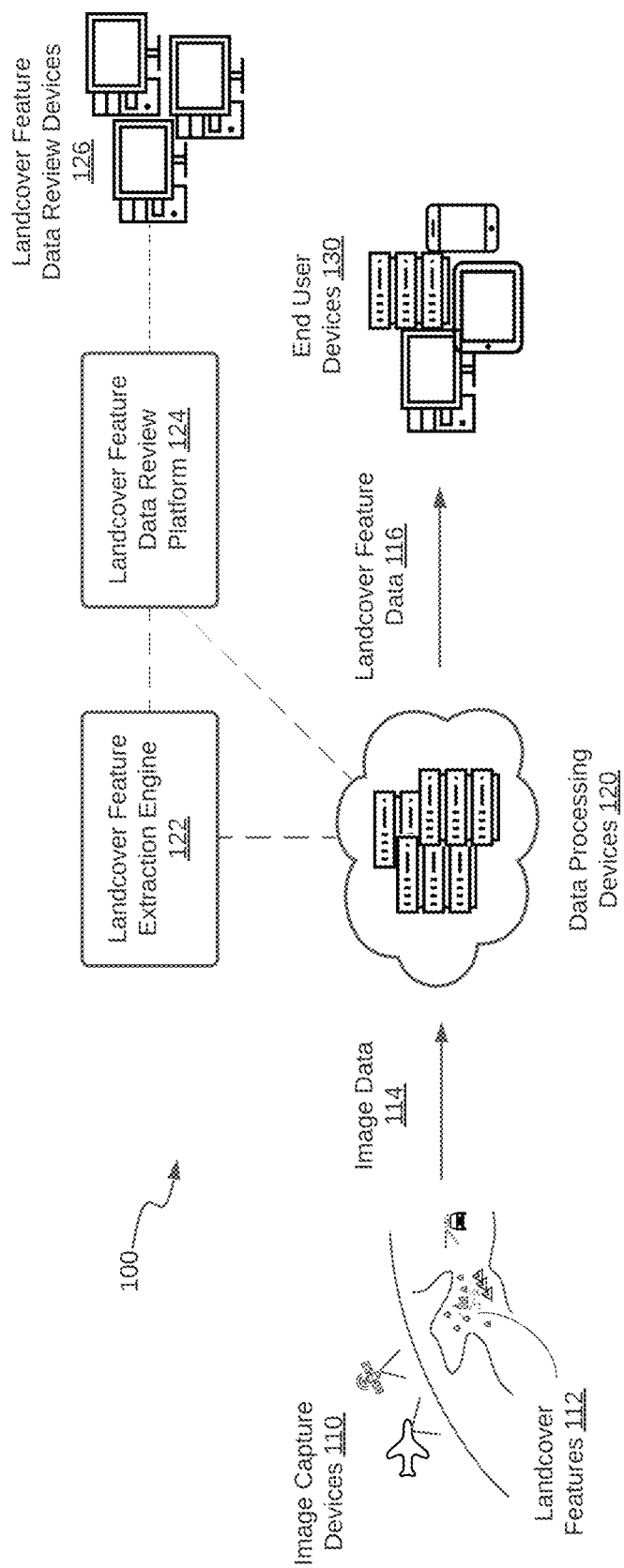
FIG. 1 is a schematic diagram of an example system for extracting and reviewing landcover feature data.

FIG. 1 is a schematic diagram of an example system 100 for extracting and reviewing landcover feature data.

The system 100 includes one or more image capture devices 110 to capture image data 114 of an area of interest containing one or more landcover features 112. A landcover feature 112 that is depicted in the image data 114 may include a built feature such as a building, road, bridge, pavement, or a natural feature such as trees, grassland, water, or area of bare land.

An image capture device 110 may include any suitable sensor (e.g., camera) onboard an aircraft, satellite, drone, or other device capable of capturing imagery of an area of interest from a generally overhead point of view (i.e., geospatial imagery). An image capture device 110 may also include any suitable sensor (e.g., camera) onboard a motor vehicle (e.g., street view car), unmanned aerial vehicle (e.g., drone), or personal device (e.g., smart phone), that is capable of capturing imagery of a landcover feature from a more oblique perspective at a ground or near-ground level.

The image data 114 comprises the raw image data captured by such image capture devices 110 along with any relevant metadata, including camera parameters (e.g., interior camera parameters and exterior camera parameters), geospatial position information (e.g., latitude and longitude position), or other relevant metadata that may be provided. The image data 114 may contain several batches of imagery covering the same area, from different points of view, which may have been captured on the same dates, or on different dates.

The system 100 further includes one or more data processing devices 120 to process the image data 114 to produce landcover feature data 116 as described herein. The data processing devices 120 include one or more computing devices, such as virtual machines or servers in a cloud computing environment comprising one or more processors for executing computing instructions. In addition to processing capabilities, the data processing devices 120 include one or more communication interfaces to receive/obtain/access the image data 114 and to output/transmit landcover feature data 116 through one or more computing networks and/or telecommunications networks such as the internet. Such computing devices further include memory (i.e., non-transitory machine-readable storage media) to store programming instructions that embody the functionality described herein.

The data processing devices 120 are configured to run (i.e., store, host or access) a landcover feature extraction engine 122. The landcover feature extraction engine 122 cooperates with a landcover feature data review platform 124 as described herein. The landcover feature extraction engine 122 and the landcover feature data review platform 124 are represented here as distinct functional units. However, this arrangement is shown for illustrative purposes only, and it is to be understood that any of the functionality described herein may be accomplished by any combination of programs, software modules, or other sets of non-transitory machine-readable instructions.

In some cases, the landcover feature data review platform 124 may be hosted by the data processing devices 120 in a manner remotely accessible by landcover feature data review devices 126 (e.g., through the internet). In other cases, parts of the landcover feature data review platform 124 may be locally executable directly at landcover feature data review devices 126 and parts of the landcover feature data review platform 124 may be hosted remotely.

In any case, the landcover feature data review devices 126 include one or more computing devices configured to run (i.e., store, host or access) the landcover feature data review platform 124. The landcover feature data review devices 126 therefore may include one or more user input devices (e.g., keyboard, mouse, touchscreen) to receive user input into the landcover feature data review platform 124 and a display device to allow a user to view a user interface provided by the landcover feature data review platform 124.

The landcover feature data 116 may be generally understood to include any data representation of landcover features. For example, the landcover feature data 116 may be in a raster format in which the pixels of an image are labelled as belonging to a particular landcover feature type. As another example, the landcover feature data 116 may be in a vector format in which the shape and size of landcover features are captured in combinations of points, lines, and/or polygons, and associated constraints, georeferenced to the imagery. In many such cases, a landcover feature may be represented by a polygon that indicates the size and shape of the landcover feature (e.g., a polygon representing a building footprint). In some examples, the vector data may also contain annotation operation data that indicates the order in which a sequence of annotation operations were performed to generate the vector data. In the vector data format, the landcover features may be represented in a two-dimensional space (e.g., XY plane) corresponding to approximately the ground plane (generally suitable for two-dimensional landcover features such as roads and terrain types). In other cases, the landcover features may be represented in a three-dimensional reconstructed space (i.e., XYZ space), in which some or all of the landcover features are modeled in three dimensions (e.g., 3D buildings).

In operation, the landcover feature extraction engine 122 accesses the image data 114 and extracts the landcover feature data 116 from the image data 114. Feature extraction may be performed according to any suitable process depending on the type of features desired and the imagery available. The landcover feature extraction engine 122 may also perform various pre-processing steps such as camera calibration (e.g., bundle adjustment). One of the image pre-processing steps may involve subdividing the area of interest covered by the image data 114 into smaller areas (i.e., image tiles) for ease of distribution among a team of data review technicians, as described in greater detail with respect to FIG. 2, below.

In some cases, the feature extraction may involve a machine learning process. For example, landcover features that can be extracted from single imagery, including two-dimensional features such as building footprint polygons, can be extracted from imagery using the machine learning process described in U.S. patent application Ser. No. 17/731,769, entitled MACHINE LEARNING FOR VECTOR MAP GENERATION, filed Apr. 28, 2022, the entirety of which is hereby incorporated by reference. As another example, landcover features that can be extracted from multiview imagery, including three-dimensional features such as 3D buildings, can be extracted from multiview imagery using the machine learning process described in U.S. patent application Ser. No. 18/319,553, entitled VECTOR DATA PROJECTION AND FEATURE MATCHING TO DETERMINE THREE-DIMENSIONAL STRUCTURE, filed May 18, 2023, the entirety of which is hereby incorporated by reference. In cases where the image data 114 is divided into smaller image tiles, these machine learning extraction processes may be applied to individual image tiles and their results may be combined to form a set of landcover features extracted from the larger area of interest.

In some cases, the feature extraction process may be preceded by an initial filtering step in which it is determined which areas of the area of interest should be subject to feature extraction in the first place. For example, in cases where the image data 114 is divided into smaller image tiles, a machine learning model may be applied to a set of image tiles covering the area of interest to determine a likelihood and/or presence of features to be extracted. Image tiles in which there are likely to be no features for extraction can be excluded from the feature extraction process to save on further processing times and resources.

Following the initial extraction by the landcover feature extraction engine 122, a subset of the landcover feature data 116 may be forwarded to the landcover feature data review platform 124 for review and/or correction where appropriate. In cases where the image data 114 is divided into smaller image tiles, each image tile may be associated with the landcover feature data 116 generated from that image tile (as described in greater detail below with respect to FIG. 2, below), forming a package of data comprising the set of landcover feature data 116 and the associated image data 114 for the image tile.

In some cases, selecting which of the landcover feature data 116 (i.e., which image tiles) to be forwarded for review may involve determining parts of the landcover feature data 116 that are most likely to contain errors, and therefore, are most likely to benefit from human revision. In some cases, this determination may involve an evaluation of confidence data associated with the extracted landcover feature data 116, as described in greater detail with respect to FIG. 2, below.

Once forwarded to the landcover feature data review platform 124, the landcover feature data 116 may be bundled into "tasks" to be reviewed by landcover feature data review technicians operating landcover feature data review devices 126. Through the landcover feature data review platform 124, these landcover feature data review technicians can be instructed to review the landcover feature data 116 against the image data 114 to identify and resolve errors or inaccuracies. The refined landcover feature data 116 may be shared back to the data processing devices 120 and combined into a final product deliverable to an end user.

Following the generation (and refinement) of the landcover feature data 116, the data processing devices 120 may provide such landcover feature data 116 to one or more end user devices 130. An end user device 130 may include one or more computing devices configured to run (i.e., store, host or access) one or more software programs to display, process, or otherwise use the landcover feature data 116 (e.g., a GIS viewer, CAD software). In some examples, an end user device 130 may include a display device and user interface and may allow a user to view and manipulate the landcover feature data 116. The end user devices 130 may use the landcover feature data 116 for any suitable application, such as to display models of the landcover features 112 through a viewer, or for other purposes.

In cases where a machine learning process is used to initially extract the landcover feature data 116, the refined landcover feature data 116 obtained from the landcover feature data review platform 124 may be further leveraged to retrain the machine learning model used in the process. Thus, the accuracy of the landcover feature extraction engine 122 may be continually improved.

Figure 2:
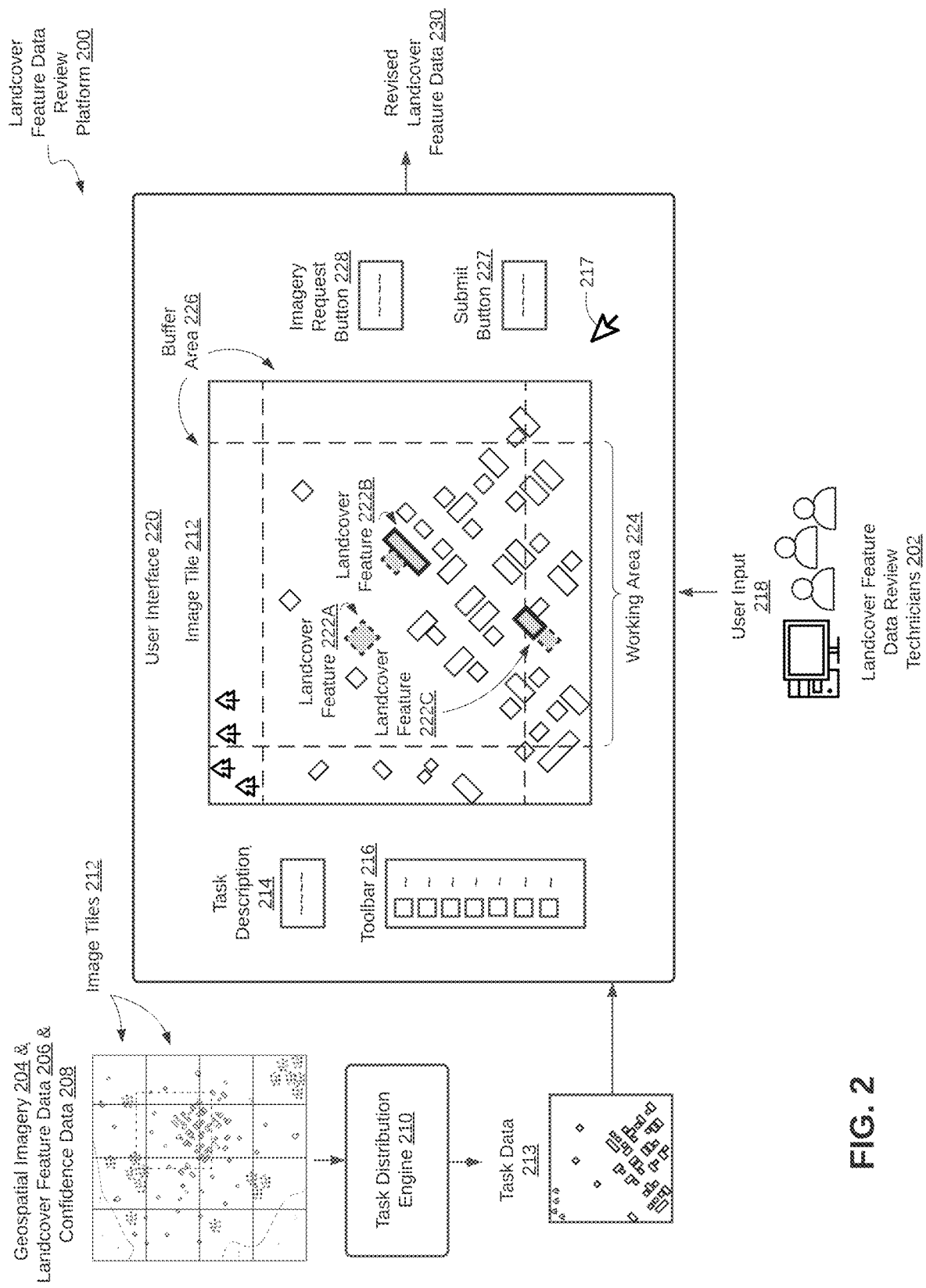
FIG. 2 is a schematic diagram of an example landcover feature data review platform for reviewing landcover feature data extracted from imagery.

FIG. 2 is a schematic diagram of an example of a landcover feature data review platform 200, which may be understood to be a non-limiting example of the landcover feature data review platform 124 of FIG. 1.

As an overview, the landcover feature data review platform 200 includes a task distribution engine 210 which assigns "tasks" to be carried out by landcover feature data review technicians 202, and includes a user interface 220 through which the landcover feature data review technicians 202 can review and revise landcover feature data 206 associated with the assigned tasks.

Beginning with the task distribution engine 210, the task distribution engine 210 accesses geospatial imagery 204, landcover feature data 206, and confidence data 208, and uses this data to assemble "tasks" for distribution to landcover feature data review technicians 202. As described in FIG. 1, this data may have been derived from an automated process performed by the landcover feature extraction engine 122 of FIG. 1. Also as mentioned in FIG. 1, this data is divided according to a set of image tiles 212, in which each image tile 212 is associated a set of geospatial imagery 204 and a set of landcover feature data 206 extracted from that geospatial imagery 204. As described below, the image tiles 212 can also be further associated with associated confidence data 208.

The task distribution engine 210 then determines, for each image tile 212, whether the image tile 212 should be subject to review. The task distribution engine 210 makes this determination for each image tile 212 with reference to the associated confidence data 208.

The confidence data 208 indicates a degree of confidence that one or more of the landcover features in the image tile 212 are accurately represented in the landcover feature data 206. The confidence data 208 may be represented on a feature-by-feature basis or on a tile-by-tile basis. In either case, the confidence data 208 may be inherent to the extraction of the landcover feature data 206 (e.g., a probability or certainty value associated with a machine learning extraction) or may be an additional data layer added by a separate analytical step (e.g., based on heuristics). For example, the confidence data 208 may be in the form of a probability value associated with the machine learning output for each extracted landcover feature. As another example, the confidence data 208 may be in the form of an overall confidence score for each image tile 212.

An image tile 212 may be determined to be subject to review based on this confidence data 208 in a number of ways. For example, an image tile 212 may be determined to be subject for review if the confidence data 208 falls below a predetermined threshold. For example, an image tile 212 may be selected for review if the probability value associated with the machine learning output for any landcover feature belonging to that image tile 212 falls below a threshold value. As another example, an overall number of "low confidence" features may be determined for each image tile 212, and an image tile 212 will only be selected for review if the image tile 212 contains a certain number of "low confidence" features (e.g., greater than 3).

With the set of image tiles 212 selected for review, the task distribution engine 210 then proceeds to assemble the appropriate data into task data 213 intended for distribution to landcover feature data review technicians 202. Each set of task data 213 contains the appropriate subset of the landcover feature data 206 and the appropriate subset of geospatial imagery 204 that belongs to the image tile 212.

Figure 6:
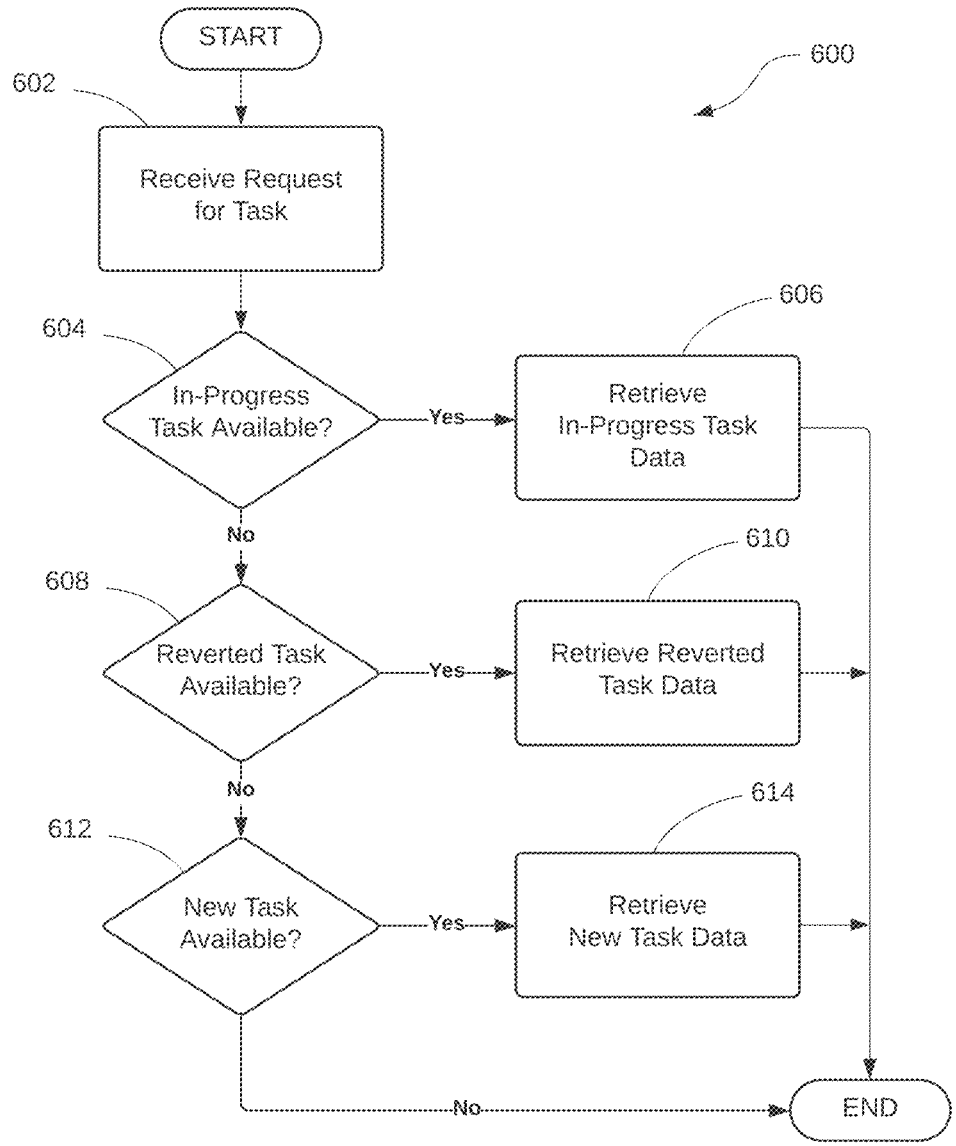
FIG. 6 is a flowchart illustrating an example method for assigning landcover feature data review technicians to image tiles in a distributed landcover feature data review platform.

With the task data 213 prepared, the task distribution engine 210 then proceeds to assign individual landcover feature data review technicians 202 to individual sets of task data 213, or, in other words, assigns individual landcover feature data review technicians 202 to review individual image tiles 212. A comprehensive method for assigning landcover feature data review technicians 202 to image tiles 212 is provided later in this disclosure in the description of FIG. 6. At this stage, however, it is sufficient to acknowledge that image tiles 212 are assigned to landcover feature data review technicians 202 in accordance with some predetermined algorithm that aims to minimize conflicts caused by landcover feature data review technicians 202 working on adjacent image tiles 212. A landcover feature data review technician 202 who is assigned task data 213 then accesses the appropriate task data 213 through the user interface 220.

The user interface 220 provides a viewport for viewing the assigned image tile 212 including the geospatial imagery 204 and associated landcover feature data 206. The user interface 220 can also provide a task description 214 to inform the landcover feature data review technician 202 as to the general nature of the assigned task (e.g., "review building footprint layer"). The user interface 220 can also provide a toolbar 216 through which the landcover feature data review technician 202 may access various tools for revising the landcover feature data 206. However, it should be noted that these user interface elements are shown for illustrative purposes only, and it is to be understood that the task instructions and the available tools may be accessed through other means (e.g., some tools may be accessed by inputting the requisite keyboard and/or mouse strokes).

It should also be noted at this stage that the image tile 212 may be divided into a working area 224 and a surrounding buffer area 226 which serve different purposes.

A working area 224 of an image tile 212 is the area which contains" the landcover feature data 206 associated with the image tile 212 that is meant to be reviewed by the landcover feature data review technician 202, whereas the buffer area is an additional space that overlaps with the working areas 224 of other adjacent image tiles 212 and provides additional visual context, and working space, to the landcover feature data review technician 202. The size and/or shape of these areas may vary depending on the imagery available and the data review task at hand. For example, a typical working area 224 may comprise a square-shaped area measuring about 1 km×1 km, whereas the buffer area 226 adds an additional 0.2 km in each direction leading to a total area of 1.2 km×1.2 km for the image tile 212.

The buffer area 226 of an image tile 212 is particularly useful in that it provides additional working space for the landcover feature data review technician 202 for cases where a landcover feature that belongs to an image tile 212 falls on the edge of the working area 224. Moreover, this buffer area 226 can also be populated with the landcover feature data 206 of adjacent image tiles 212 which provide even further context when several features are being extracted nearby one another.

In some cases, the buffer area 226 may only be populated with the landcover feature data 206 of an adjacent image tile after that adjacent image tile 212 has been reviewed by a landcover feature data review technician 202. This is so that a landcover feature data review technician 202 can comment on and/or edit the worked performed by another landcover feature data review technician 202 without interfering with the workflow for that landcover feature data review technician 202.

It should be noted at this stage that these working areas 224 and buffer areas 226 for the image tiles 212 may have been determined at the imagery pre-processing and/or initial feature extraction stage by the landcover feature extraction engine 122. Indeed, the machine learning model for extracting landcover features from image tiles 212 may have operated within these working areas 224 (i.e., extracting features from working areas 224 but provided the additional context of the surrounding buffer areas 226).

Further, it should be noted that landcover feature data 206 may be assigned to one image tile 212 or another based on whether the landcover features land within the working area 224 of an image tile 212 as opposed to its buffer area 226. However, this process of assigning landcover features to image tiles 212 may not always be as simple as assigning landcover features that fall within the boundaries of a working area 224 of an image tile 212 to that image tile 212. Indeed, as mentioned above, in many cases, some landcover features are likely to fall on the boundary between the working areas 224 of image tiles 212 and therefore may not be "contained" within the working area 224 of any single image tile 212. Thus, the task distribution engine 210 may assign landcover features to image tiles 212 in accordance with some predetermined algorithm that accounts for such occurrences. For example, for smaller landcover features such as buildings, the features that intersect the bottom and/or right sides of a working area 224 of an image tile 212 may be associated with that image tile 212, whereas the features that intersect the top and/or left sides of the working area 224 of the image tile 212 may be associated with the adjacent image tile. For larger landcover features such as roads, the features may simply be cut off at the task boundary, with each piece of the feature being assigned to one or the other image tile.

Returning to the function of the user interface 220, as a general approach, the landcover feature data review technician 202 reviews the landcover feature data 206 provided with the image tile 212 against the associated geospatial imagery 204 and provides user input 218 to make any revisions as appropriate using the available tools. The landcover feature data review technician 202 may annotate the imagery to capture new landcover features that were missed by the initial extraction, and/or edit existing landcover feature data 206 that may have been captured incorrectly. In some cases, the task of the landcover feature data review technician 202 may be instructed to review the entire set of landcover feature data 206 associated with the assigned image tile 212. In other cases, the task may be to address only certain features that have been flagged for review (e.g., based on the associated confidence data 208 falling below a threshold), and in those cases, the user interface 220 may draw the attention of the landcover feature data review technician 202 to the landcover features at issue (e.g., by visually highlighting the problematic data elements in some manner).

In any case, a few illustrative scenarios in which a landcover feature data review technician 202 revises the landcover feature data 206 will be described here. As a first example, it can be seen that the image tile 212 contains landcover feature 222A, which indicates a building that appears to have been missed by the automated extraction process by which the landcover feature data 206 was initially generated. In this case, the landcover feature data review technician 202 would access the appropriate tools to generate a new data element representing the missed feature. For example, the landcover feature data review technician 202 may use the mouse cursor 217 to access the appropriate "draw building" tool selected from the toolbar 216 and may proceed to outline the rooftop polygon of the missing building.

As another example, it can be seen that the image tile 212 also contains landcover feature 222B, which indicates a building which was incorrectly captured by the automated extraction process by which the landcover feature data 206 was generated. In this case, the landcover feature data review technician 202 would access the appropriate tools to modify the data element representing the erroneously extracted feature (e.g., by extending the rooftop polygon to capture the full building rooftop).

As another example, it can be seen that the image tile 212 also contains landcover feature 222C, which indicates a building which spans the border between the working area 224 and the buffer area 226. The landcover feature 222C may have been missed or incorrectly extracted in some manner that the landcover feature data review technician 202 may remedy as described above. As described above, in doing so, the technician 202 has full access to both working area 224 and the buffer area 226 to make the necessary correction.

Figure 4:
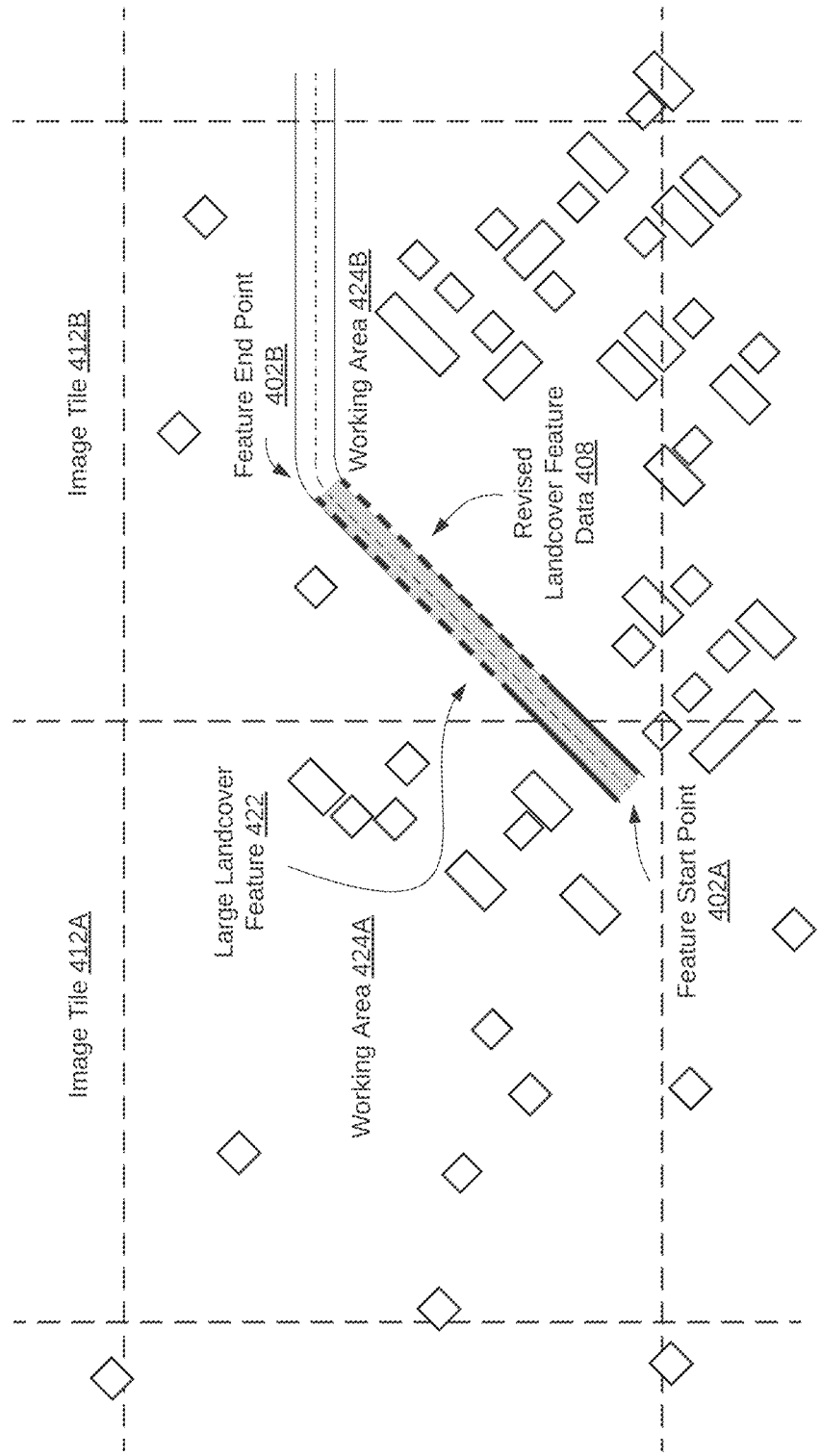
FIG. 4 illustrates an example use case of a landcover feature data review platform in which a landcover feature data review technician makes a revision to a landcover feature that spans two adjacent image tiles.

The user interface 220 may include additional user interface elements that facilitate workflow, such as a "submit" button 227 that the landcover feature data review technician 202 may engage to indicate that review of the assigned image tile 212 is complete, and a "imagery request" button 228 that the landcover feature data review technician 202 may engage to request additional imagery outside of the image tile 212 that may be necessary to complete particular data review task (described in greater detail with reference to FIG. 4). Further, the landcover feature data review platform 200 may provide functionality for running a topology error detection algorithm on the landcover feature data 206. Such a topology error detection algorithm may include any algorithm suitable for identifying common topological errors in vector data (e.g., no invalid geometries). The topology error detection algorithm may be executed at will, or may be triggered automatically when a technician presses the "submit" button 227. In some cases, the landcover feature data review platform 200 may restrict the revised landcover feature data 230 from being submitted (or accepted) until the topological error detection algorithm is passed.

Further, the landcover feature data review platform 200 may provide functionality for checking, before a landcover feature data review technician 202 submits the image tile 212 as being complete, whether any landcover feature data for an adjacent image tile has recently been reviewed since the time the landcover feature data review technician 202 began working on the image tile 212. In such a case, the landcover feature data review technician 202 may be provided with the option to download and view the recently reviewed landcover feature data (which may then be populated in the buffer area 226), thereby providing the landcover feature data review technician 202 with the chance to make further revisions to the landcover feature data 206 for the image tile 212 before submitting.

In sum, the landcover feature data review platform 200 provides an effective means for a distributed group of landcover feature data review technicians 202 to review and revise a large set of landcover feature data 206. The resulting revised landcover feature data 230 may be used to substitute, or supplement, at least a portion of the initially extracted landcover feature data 206. The revised landcover feature data 230 may also be used to further train a machine learning model that may have been used in the initial extraction of the landcover feature data 206, thereby providing a means for continuously improving the accuracy of the extracted data.

Figure 3:
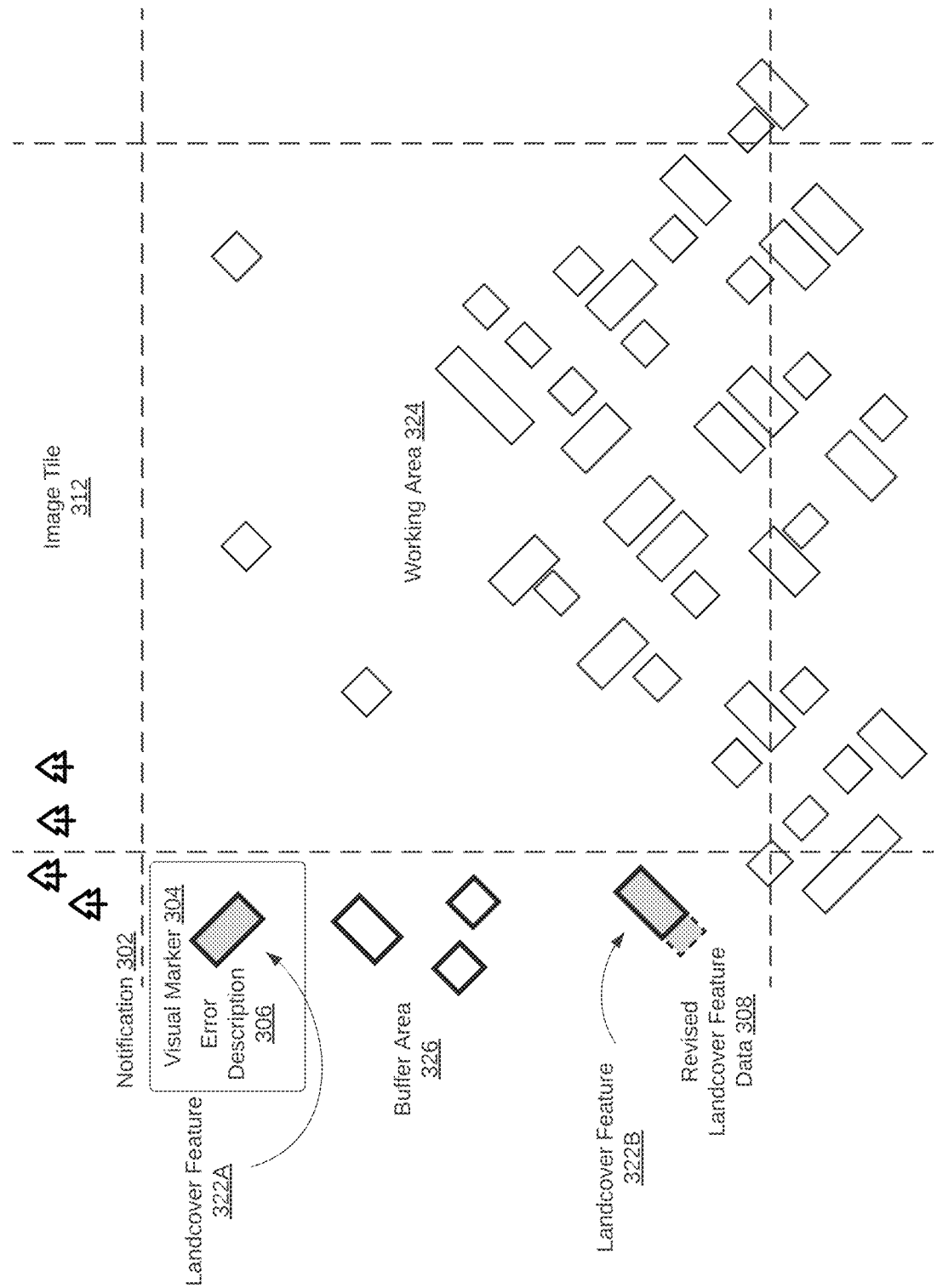
FIG. 3 illustrates an example use case of a landcover feature data review platform in which a landcover feature data review technician assigned to review an image tile makes a revision regarding landcover feature data that belongs to an adjacent image tile.

As mentioned above, there are use cases for a landcover feature data review platform in which a landcover feature data review technician makes a revision to a landcover feature that belongs to an adjacent image tile. This scenario is illustrated in FIG. 3, where a landcover feature data review technician, who is assigned to an image tile 312, comprising a working area 324 and buffer area 326, interacts with landcover feature data located in the buffer area 326, which belongs to an adjacent image tile. This landcover feature data in the adjacent image tile may have been previously reviewed by another landcover feature data review technician who may have missed the errors.

As one example interaction, it can be seen that the buffer area 326 of the image tile 312 contains a landcover feature 322A that was missed or erroneously captured by both the automated extraction process and the assigned technician. In this case, the technician assigned to the image tile 312 may choose to address the error by generating a notification 302 regarding the error. The notification 302 may comprise a visual marker 304, such as a window, box, or other marker placed in the vicinity of the landcover feature 322A that identifies the landcover feature 322A that is the subject of the notification 302. The notification 302 may also comprise an error description 306, which may include a text description, categorization of error type, or other description of the nature of the error. The notification 302 may be associated with the landcover feature data for the landcover feature 322A (e.g., appended as metadata) and stored by the landcover feature data review platform for viewing by the technician who is assigned to the adjacent image tile or a supervising technician. The creation of the notification 302 may cause the creation of another task (i.e., a "ticket") to be addressed in the workflow of the supervising technician or other technician. Thus, using these available tools, although the technician assigned to the image tile 312 may not have been specifically instructed to comment on the landcover feature 322A (which may have been assigned to a different technician), the technician is provided the opportunity to collaborate in the overall data review effort by identifying an error made in an adjacent image tile.

As another example interaction, it can be seen that the buffer area 326 of the image tile 312 contains yet another a landcover feature 322B that was missed or erroneously captured by both the automated extraction process and the assigned technician. In this case, the landcover feature data review technician may choose to directly revise the data element representing the erroneously extracted feature (e.g., by extending the rooftop polygon to capture the full building rooftop), and in doing so, generate revised landcover feature data 308. However, since the landcover feature 322B belongs to an adjacent image tile assigned to a different landcover feature data review technician, the landcover feature data review platform may register the revised landcover feature data 308 according to a separate process in which a notification is generated for the assigned technician, or to a supervising technician, to review the revised landcover feature data 308, before the amendment is accepted. In this case, the landcover feature data review platform provides another opportunity for groups of landcover feature data review technicians to collaborate toward improving the accuracy of landcover feature data.

As mentioned above, there are use cases for a landcover feature data review platform in which a landcover feature data review technician makes a revision to a landcover feature that spans two adjacent image tiles. This scenario is illustrated in FIG. 4, in which a landcover feature data review technician assigned to an image tile 412A makes a revision to a landcover feature 422 that spans from the image tile 412A into an adjacent image tile 412B. Further, although the buffer areas of the image tiles 412A, 412B are not shown (to reduce visual clutter), it is to be understood that the landcover feature 422 (in this case, a road segment) crosses over from the working area 424A of the image tile 412A into the working area 424B of an adjacent image tile 412B.

Suppose the error to be corrected is that the landcover feature 422, as originally extracted, does not completely extend from the feature start point 402A, which indicates the start of the road segment, to the feature end point 402B, which indicates the end of the road segment (i.e., the next bend in the road). In this case, if the technician assigned to the image tile 412A were required to ensure that the landcover feature 422 fully extends from the feature start point 402A to the feature end point 402B, which would normally not be accessible to the technician, then the technician may request the imagery corresponding to the adjacent image tile 412B (e.g., using the "imagery request button 228" of FIG. 2) in order to complete the revision.

Upon receiving a request for additional imagery for the adjacent image tile 412B, the landcover feature data review platform may obtain the appropriate imagery, and distribute the appropriate imagery to the requesting technician. In some cases, the landcover feature data associated with the adjacent image tile 412B may also be obtained, which may assist the technician in completing the revision of the landcover feature 422 in its surrounding context (e.g., with visual cues of nearby buildings and/or other landcover features). In any case, the technician may revise the landcover feature 422, and in doing so, generate revised landcover feature data 408. Thus, the landcover feature data review platform provides an opportunity for a landcover feature data review technician to share in the available imagery, including imagery to which the landcover feature data review technician may not have been originally assigned, in order to properly capture a landcover feature that spans multiple adjacent image tiles.

Turning now to methods for assigning landcover feature data review technicians to review landcover feature data, in the above description, reference is made to the need to make such assignments in a manner that minimizes the change for conflict to emerge during the data review process. In particular, it may be advantageous for a method for assigning landcover feature data review technicians to review landcover feature data to minimize the likelihood that any two data reviewers will be assigned to work on adjacent image tiles simultaneously. This may be achieved, at least in part, by following a predetermined sequence dictated by a static priority map, in which each image tile is assigned a priority value that is non-consecutive with each adjacent image tile, and landcover feature data reviewers are assigned to image tiles based on the priority values of these image tiles (e.g., in ascending or descending order). An example of such a static priority map is provided in FIG. 5, in which a static priority map 500 comprises a grid of image tiles 502 in which each image tile 502 is assigned a priority value 504 that is non-consecutive with the priority value 504 assigned to each adjacent image tile 502. In this setup, it is unlikely that any two data reviewers will be assigned to work on adjacent image tiles simultaneously.

Figure 5:
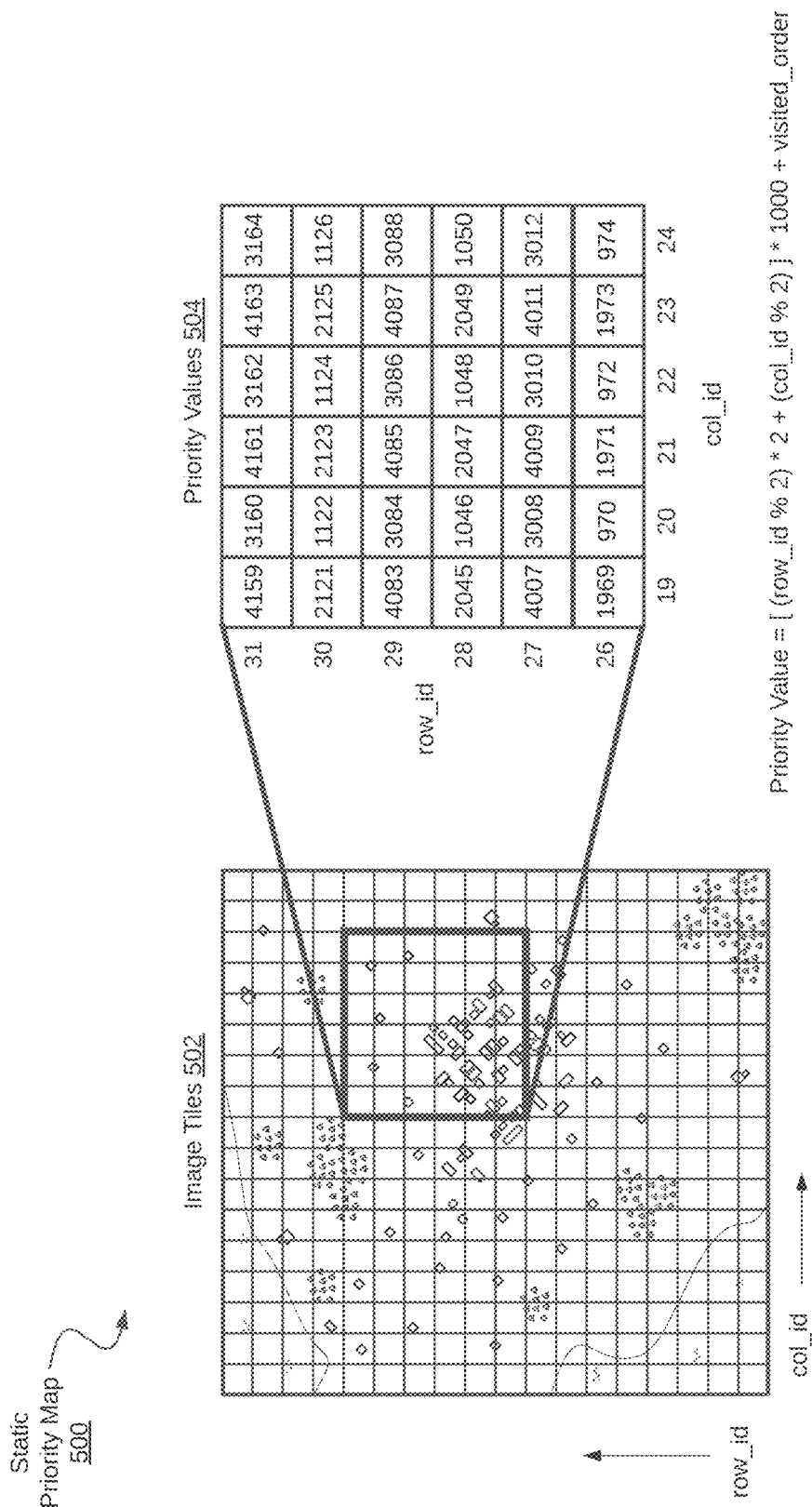
FIG. 5 is an illustration of an example static priority map that sets out a predetermined sequence in which a grid of image tiles containing landcover feature data extracted from imagery covering a geographic area can be assigned to landcover feature data review technicians for review.

In the static priority map 500, the priority values 504 are generated based on the row and column positions of the image tiles 502. As can be seen in FIG. 5, each image tile 502 is labeled with its row position (i.e., "row_id") and column position (i.e., "col_id"). In this particular example, for each image tile 502, its priority value 504 is calculated based on the following Equation 1:

$$PV=[(row\_id \: \%2)*2+(col\_id \: \%2)]*1000+visited\_order \quad (1)$$

wherein PV refers to the priority value 504 of an image tile 502, "row_id" refers to the row position of the image tile 502, "col_id" refers to the column position of the image tile 502, the operator "%" refers to the modulo operation, and "visited_order" is an incrementor. It should be noted that the parameters used in Equation 1 may be varied with experimentation. For example, the equation "PV=[(row_id % 2)*2+(col_id % 2)]*1,000,000+visited_order" may work similarly well. The important feature of Equation 1 is that it provides a mapping for each image tile 502 to a unique priority value 504 in which the priority value 504 for each image tile 502 is non-consecutive with each adjacent image tile 502. Preferably, the priority value 504 of each image tile 502 is far apart from the priority value 504 of each adjacent image tile 502, so that it is likely that there will be many more image tiles 502 assigned for data review before any two adjacent image tiles 502 are assigned for review. This is achieved in FIG. 5, in which the image tile 502 at row 27 column 20 is assigned the priority value 504 of "3008" whereas the adjacent image tiles 502 are assigned the priority values 504 of "4007", "1046", "4009", and "970".

This "static" approach for assigning landcover feature data review technicians to image tiles based on a static priority map may be complemented by a "dynamic" component that takes into consideration the progress being made toward reviewing the set of image tiles. This dynamic component is captured in FIG. 6, which illustrates an example method 600 for assigning landcover feature data review technicians according to a static priority map as well as additional workflow considerations. Indeed, the method 600 may be understood to be one example method for how the landcover feature data review platform 200 may assign image tiles to landcover feature data review technicians.

At step 602, a request for a task (i.e., image tile) is received by the landcover feature data review platform. Depending on the architecture of the landcover feature data review platform, the request for a task may take several forms. For example, if the landcover feature data review platform is a web platform accessible by technicians remotely, the request may be made by a user logging into the system and requesting a task for work. If the landcover feature data review platform includes locally executable software, the request may be in the form of a transmission made from the a landcover feature data review technician's machine to a central task distribution server.

At step 604, it is determined whether an in-progress task is available for the technician who made the request. An in-progress task refers to an unfinished task that the technician may be returning to the system to complete. In-progress tasks may be "locked" to other technicians so that no other technician can be assigned the same task. If an in-progress task is available, then at step 606, the landcover data review platform retrieves the appropriate data for the in-progress task (e.g., imagery and landcover feature data) and distributes and/or makes available the data to the requesting technician.

It should be noted at this stage that various data protection controls can be implemented by the landcover data review platform to prevent unauthorized access to imagery, landcover feature data, or other data, for unintended or unauthorized purposes. For example, if the landcover feature data review platform includes locally executable software, the software may be limited to downloading the data for a single image tile at a time. Some exceptions may apply. For example, the software may allow the technician to download a small number of tasks to reduce time spent waiting for tasks to download. As another example, a technician may be permitted to download additional imagery when the technician makes a request for additional imagery (e.g., as discussed in FIG. 4).

Returning to the method 600, if it is determined that there is no in-progress task available for the requesting technician, then at step 608 it is determined whether a reverted task is available for the requesting technician. A reverted task refers to a task that was previously completed by the requesting technician but which requires additional work from the requesting technician. For example, a reverted task may refer to a task that was reviewed by a supervising technician who made one or more comments that are to be addressed by the requesting technician (e.g., including, for example, one or more comments and/or revisions made by a technician assigned to an adjacent image tile, as described in FIG. 3). If a reverted task is available, then at step 610, the landcover data review platform retrieves the appropriate data for the in-progress task (e.g., imagery and landcover feature data) and distributes and/or makes available the data to the requesting technician.

If it is determined that there are no reverted tasks available for the requesting technician, then at step 612 it is determined whether there is a new task available to the requesting technician. A new task refers to a task that has not yet been assigned to any data review technician. Selection of a new task data may be made with reference to a static priority map (e.g., as described in FIG. 5). If a new task is available, then at step 614, the landcover data review platform retrieves a new set of task data and distributes and/or makes available the data to the requesting technician.

The method 600 therefore provides a method for assigning landcover feature data review technicians according to a static priority map as well as additional workflow considerations. Variations to the method 600 are contemplated, including additional workflow considerations that account for landcover feature data review technicians being assigned to work in one or more teams and/or one or more groups in a hierarchical structure, who may share work among one another according to a set of rules. In some cases, for example, reverted tasks of any team member may be made available to any other team member, thereby further encouraging collaboration among team members. Further, there may be other forms of the method 600 in which different data review technicians occupy different roles in the data review process (e.g., different data review technicians may be assigned to different task types and/or feature types). Moreover, there may be other forms of the method 600 for supervising technicians who are assigned tasks for reviewing work completed by lower-level technicians, for whom the task assignment process may involve a similar prioritization of in-progress tasks, new tasks for review, and reverted tasks for review.

Figure 7:
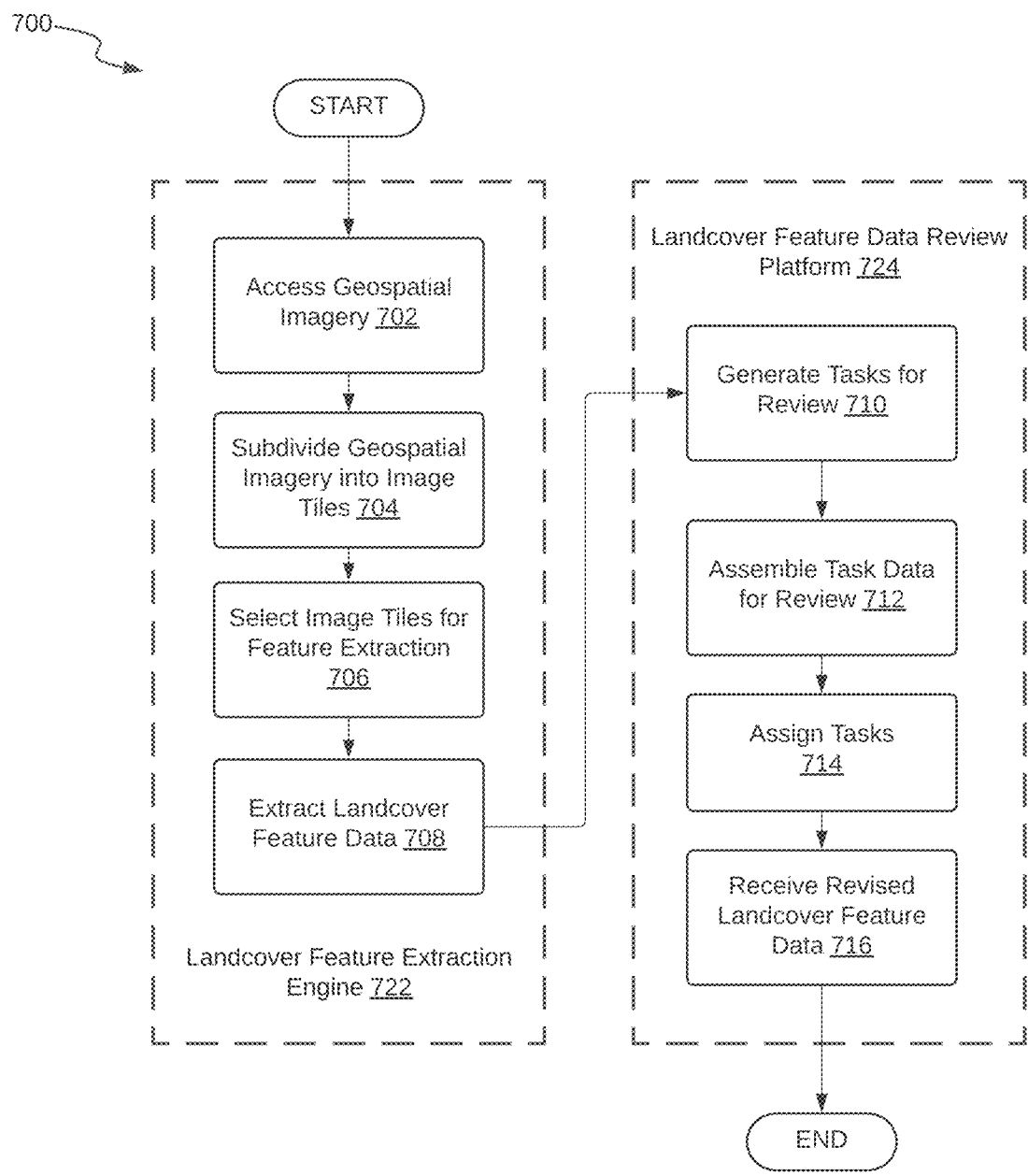
FIG. 7 is a flowchart of an example method for extracting and reviewing landcover feature data that involves extracting landcover feature data from imagery using a machine learning model and revising the extracted landcover feature data using a distributed landcover feature data review platform.

The methods described herein are summarized in FIG. 7, which provides a method 700 for extracting and reviewing landcover feature data that involves a machine learning model and distributed landcover feature data review platform.

Beginning at the extraction stage, at step 702, a landcover feature extraction engine 722 (e.g., the landcover feature extraction engine 122 of FIG. 1) accesses geospatial imagery covering an area of interest. At step 704, the landcover feature extraction engine 722 subdivides the geospatial imagery into a more workable set of smaller image tiles. At step 706, the landcover feature extraction engine 722 filters through and selects a subset of the image tiles for feature extraction, based on, for example, a likelihood that the selected image tiles contain the desired feature to be extracted. At step 708, the landcover feature extraction engine 722 extracts landcover feature data from the selected image tiles, by, for example, applying a machine learning model to extract the desired features.

Turning to the data review stage, at step 710, a landcover feature data review platform 724 (e.g., the landcover feature data review platform 124 of FIG. 1) generates a set of tasks for review, corresponding to, for example, each image tile for which there is a likelihood that the image tile contains erroneous landcover feature data. At step 712, the landcover feature data review platform 724 assembles task data for each task, comprising the imagery for the image tile and the corresponding landcover feature data extracted from that image tile. At step 714, the landcover feature data review platform 724 assigns the assembled tasks to landcover feature data review technicians, who use the landcover feature data review platform 724 to generate revised landcover feature data with improved accuracy. At step 716 the landcover feature data review platform 724 receives the revised landcover feature data, which can be used directly in a final product and/or used to further train a machine learning model.

Therefore, it should be seen from the present disclosure that systems and methods for extracting and reviewing landcover feature data can be provided in which the risk of conflicts among data reviewers can be minimized, collaboration among data reviewers can be leveraged, and the improved data quality can be used to train a machine learning model as part of a continuous quality improvement process. Although these systems and methods are illustrated in the above figures by way of non-limiting examples, it is emphasized that variations to these examples in which the benefits of the teachings described herein can still be achieved are contemplated.

For instance, although the described examples refer to the use of geospatial imagery as a data source for the extraction of landcover feature data, it is contemplated that other forms of imagery equally be used for the extraction of landcover features (e.g., ground-level imagery of a building). Further, it is contemplated that other feature types aside from landcover features can be extracted from imagery as well (e.g., objects in a visual scene can be extracted from smartphone imagery). Thus, for example, a process that involves using street-view imagery for semantic feature extraction may equally benefit from a quality control process in which the street-view imagery is divided into image tiles which are distributed among of data reviewers who are instructed to review and revise the extracted feature data in a manner similar to the manner described above.

Further, although the imagery used in image tiles may often by the same imagery from which the landcover feature data was extracted, it is contemplated that in some cases, landcover feature data may be compared against different imagery, provided that the imagery covers the same area (e.g., but perhaps captured at a different time or date). In some cases, it may be preferred that the alternative imagery set is properly aligned with the landcover feature data so as to resolve any misalignment issues, allowing the data review technicians to focus on feature extraction issues. In other cases, however, another advantage of the quality control processes described herein is that they may capture and address such misalignment issues.

Moreover, although the data review process described herein may be particularly useful for aiding in quality control and/or retraining of a machine learning model, it is contemplated that the quality control systems and processes described above may equally be applicable to use cases in which landcover feature data is extracted from imagery in a more conventional (i.e., non-machine learning process), including human-extraction processes, in which the initially extracted data could still benefit from a quality control step.

Finally, it should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:
1. A method comprising:
 accessing geospatial imagery covering an area of interest and a corresponding set of landcover feature data that was extracted by a machine learning model with reference to the geospatial imagery covering the area of interest, wherein the area of interest is divided the area of interest into a grid of image tiles;
 determining confidence data associated with each subset of landcover feature data within each image tile that reflects a level of confidence that the landcover feature data within the image tile was correctly extracted by the machine learning model;
 generating and assigning tasks for team members of a team of landcover feature data review technicians to review the image tiles in which the landcover feature data is of low confidence;
 providing functionality for the team members to view the geospatial imagery and landcover feature data within an assigned image tile and to make corrections to the landcover feature data with reference to the geospatial imagery; and receiving one or more corrections to the landcover feature data from systems operated by the landcover feature data review technicians.

2. The method of claim 1, wherein assigning the tasks comprises:

determining a unique priority value to be assigned to each image tile covering the area of interest, wherein the unique priority values are determined such that the priority value for each image tile is non-consecutive with each adjacent image tile; and assigning tasks to team members based on an increasing or decreasing sequence through the priority values.

3. The method of claim 1, further comprising:

providing functionality for the team members to review the corrections made by other team members and to generate tasks for team members to review previously reviewed image tiles.

4. The method of claim 1, wherein each image tile comprises a working area and a surrounding buffer area, wherein the surrounding buffer area overlaps with the working areas of adjacent image tiles, and wherein the method further comprises:

providing functionality for the team members to generate a notification for a team member assigned to an adjacent image tile regarding an error, or correction, to landcover feature data within the buffer area.

5. The method of claim 1, further comprising:

providing functionality for the team members to make corrections to elements of landcover feature data that span across two adjacent image tiles.

6. The method of claim 1, further comprising:

fine-tuning the machine learning model based on the one or more modifications to the landcover feature data and the associated geospatial imagery.

7. The method of claim 1, further comprising:

providing an online landcover feature data review platform with functionality to generate and assign the tasks to the team members, with functionality for the team members to make the corrections to the landcover feature data, and with functionality to receive the corrections to the landcover feature data.

8. The method of claim 1, further comprising:

merging the one or more corrections to the landcover feature data with the landcover feature data.

9. The method of claim 1, wherein the landcover feature data comprises vector data, and wherein the one or more corrections to the landcover feature data comprises a correction to the geometry of a polygon within the landcover feature data.

10. A system comprising one or more computing devices configured to:

access geospatial imagery covering an area of interest and a corresponding set of landcover feature data that was extracted by a machine learning model with reference to the geospatial imagery covering the area of interest, wherein the area of interest is divided the area of interest into a grid of image tiles;

determine confidence data associated with each subset of landcover feature data within each image tile that reflects a level of confidence that the landcover feature data within the image tile was correctly extracted by the machine learning model;

generate and assign tasks for team members of a team of landcover feature data review technicians to review the image tiles in which the landcover feature data is of low confidence;

provide functionality for the team members to view the geospatial imagery and landcover feature data within an assigned image tile and to make corrections to the landcover feature data with reference to the geospatial imagery; and receive one or more corrections to the landcover feature data from systems operated by the landcover feature data review technicians.

11. At least one non-transitory machine-readable storage medium comprising instructions that when executed cause one or more processors to:

access geospatial imagery covering an area of interest and a corresponding set of landcover feature data that was extracted by a machine learning model with reference to the geospatial imagery covering the area of interest, wherein the area of interest is divided the area of interest into a grid of image tiles;

determine confidence data associated with each subset of landcover feature data within each image tile that reflects a level of confidence that the landcover feature data within the image tile was correctly extracted by the machine learning model;

generate and assign tasks for team members of a team of landcover feature data review technicians to review the image tiles in which the landcover feature data is of low confidence;

provide functionality for the team members to view the geospatial imagery and landcover feature data within an assigned image tile and to make corrections to the landcover feature data with reference to the geospatial imagery; and receive one or more corrections to the landcover feature data from systems operated by the landcover feature data review technicians.

* * * * *